(12) United States Patent
Burgermeister

(10) Patent No.: US 10,924,032 B2
(45) Date of Patent: *Feb. 16, 2021

(54) INVERTER AND METHOD FOR OPERATING AN INVERTER WITH ANGLE-INDEPENDENT VARIATION OF PULSE DUTY FACTOR OF SWITCHING ELEMENTS

(71) Applicant: Schmidhauser AG, Romanshorn (CH)

(72) Inventor: Andreas Burgermeister, Mauren (CH)

(73) Assignee: Schmidhauser AG, Romanshorn (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,436

(22) Filed: Jun. 25, 2019

(65) Prior Publication Data
US 2019/0393803 A1    Dec. 26, 2019

(30) Foreign Application Priority Data
Jun. 26, 2018  (DE) .................... 10 2018 210 394

(51) Int. Cl.
*H02M 7/5387* (2007.01)
*H02M 7/5395* (2006.01)

(52) U.S. Cl.
CPC ....... *H02M 7/5387* (2013.01); *H02M 7/5395* (2013.01)

(58) Field of Classification Search
CPC ...... H02M 7/483; H02M 7/521; H02M 7/527; H02M 7/529; H02M 2001/0009
See application file for complete search history.

(56) References Cited

U.S. PATENT DOCUMENTS

| | | |
|---|---|---|
| 8,816,612 B2 | 8/2014 | Suzuki |
| 2013/0264974 A1* | 10/2013 | Suzuki ................ H02P 27/08 318/139 |

FOREIGN PATENT DOCUMENTS

DE     10 2007 021 368 A1     11/2008

OTHER PUBLICATIONS

N. S. Preda, I. I. Incze, M. Imecs and C. Szabo, "Flat-Top space-vector modulation implemented on a fixed-point DSP," 2009 5th International Symposium on Applied Computational Intelligence and Informatics, Timisoara, 2009, pp. 153-158. (Year: 2009).*

* cited by examiner

*Primary Examiner* — Peter M Novak
(74) *Attorney, Agent, or Firm* — Crowell & Moring LLP

(57) ABSTRACT

A method operates an inverter, wherein the inverter includes a number of bridge arms with respective bridge terminals, wherein a respective bridge arm is electrically connected on a first side to a first intermediate circuit pole of the inverter, and wherein a respective bridge arm is electrically connected on a second side to a second intermediate circuit pole of the inverter. A respective bridge arm has at least two switching elements, wherein a respective bridge terminal, depending upon a circuit state of the switching elements in the bridge arm, is electrically connected either to the first intermediate circuit pole or to the second intermediate circuit pole. A shunt resistor is arranged in a respective bridge arm. The method actuates the respective switching elements of the bridge arms via pulse width modulation with a temporally variable pulse duty factor, such that voltages between the bridge terminals show a temporally defined characteristic. The respective switching elements of the bridge arms are actuated with flat-top modulation for specific angular ranges of a respective fundamental wave, and a respective pulse duty factor for the switching elements of (Continued)

the bridge arms, immediately ahead of and/or immediately after the angular ranges, varies within a predefined time interval in an angularly-independent manner.

16 Claims, 2 Drawing Sheets

ZIV is constant for rotating field frequency from
0 Hz to threshold rotating field frequency (e.g., 40 Hz)

INVERTER AND METHOD FOR OPERATING AN INVERTER WITH ANGLE-INDEPENDENT VARIATION OF PULSE DUTY FACTOR OF SWITCHING ELEMENTS

CROSS REFERENCE TO RELATED APPLICATIONS

This application claims priority under 35 U.S.C. § 119 from German Patent Application No. 10 2018 210 394.1, filed Jun. 26, 2018, the entire disclosure of which is herein expressly incorporated by reference.

BACKGROUND AND SUMMARY OF THE INVENTION

The invention relates to an inverter and a method for operating an inverter.

The object of the invention is to provide an inverter and a method for operating the inverter which permit a reliable "emitter shunt" current measurement with simultaneously low electrical switching losses.

This object is fulfilled by the claimed invention.

The method according to the invention is employed for operating an inverter. Within the meaning of the invention, an inverter is an electrical device which converts a direct voltage into an alternating voltage or a direct current into an alternating current. The inverter can be an element of a frequency converter.

The inverter comprises a number of bridge arms, for example three bridge arms.

The bridge arms customarily comprise respective bridge terminals to which, for example, a three-phase AC motor is connectable.

A respective bridge arm is customarily electrically connected on a first side to a first intermediate circuit pole of the inverter, and electrically connected on a second side to a second intermediate circuit pole of the inverter. On the first intermediate circuit pole, in service, a positive intermediate circuit potential can be applied, and on the second intermediate circuit pole, in service, a negative intermediate circuit potential can be applied. An intermediate circuit voltage can be constituted by a difference between the positive and negative intermediate circuit potentials.

A respective bridge arm comprises at least two actuatable (semiconductor) switching elements, for example in the form of IGBTs (insulated-gate bipolar transistors).

A respective bridge terminal of the bridge arms, depending upon a circuit state of the switching elements in the bridge arm, is electrically connected either to the first intermediate circuit pole or to the second intermediate circuit pole. If, in a respective bridge arm, two switching elements are provided, one of the two switching elements is typically conducting and the other is non-conducting, in all cases.

In a respective bridge arm, a current measuring device is customarily provided, for example in the form of a shunt resistor which assumes (or can assume) a measuring function, according to a circuit state of the switching elements, or otherwise. The shunt resistor can, for example, permit a conventional emitter shunt current measurement. The shunt resistor is typically interpolated between a respective bridge terminal of a bridge arm and the second intermediate circuit pole.

The circuit state of the switching elements which executes or permits the measuring function is typically that circuit state in which the upper switching element (the switching element which is electrically connected to the first intermediate circuit pole) of the bridge arm is open, and the lower switching element (the switching element which is electrically connected to the second intermediate circuit pole) of the bridge arm is closed, such that a current to be measured can flow through the shunt resistor.

The method according to the invention comprises the steps described hereinafter.

The respective switching elements of the bridge arms are actuated by pulse width modulation with a temporally variable pulse duty factor, such that voltages between the bridge terminals assume a temporally predefined characteristic, for example an approximately sinusoidal characteristic.

A value for the pulse duty factor establishes or indicates, for a periodic sequence of pulses, the ratio of the pulse duration to the cycle time, in this case the pulse width modulation. The pulse duty factor is expressed as a numerical ratio, with a range of values from 0 to 1 or 0 to 100%. The pulse duty factors To of upper switching elements (switching elements connecting the bridge terminal to the first intermediate circuit pole) and the pulse duty factors Tu of lower switching elements (switching elements connecting the bridge terminal to the second intermediate circuit pole) assume the following mutual relationship: To+Tu=1, given that, in all cases, only one of the switching elements on the bridge arms is conductive. A pulse duty factor value of 100% for the lower switching element, for example, can signify that the lower switching element is permanently on (measurement is possible) wherein, in this case, the pulse duty factor of the upper switching element must be 0%, i.e. the upper switching element is permanently off. Correspondingly, a pulse duty factor value of 0% for the lower switching element can signify that the lower switching element is permanently off (measurement is not possible) wherein, in this case, the pulse duty factor of the upper switching element must be 100%, i.e. the upper switching element is permanently on. Finally, an exemplary pulse duty factor value of 20% for the lower switching element signifies that the lower switching element is on for 20% of the cycle time (measurement is typically possible) wherein, in this case, the pulse duty factor of the upper switching element must be 80%, i.e. the upper switching element is on for 80% of the cycle time. In this regard, reference may otherwise be made to the relevant specialized literature.

The respective switching elements of the bridge arms are actuated for specific angular ranges of a respective fundamental wave, with flat-top modulation.

A fundamental wave extends, for example, over an entire cycle (360° angle) of a sinusoidal voltage between two bridge terminals, which is generated by the appropriate actuation of the inverter.

The object of flat-top modulation is the reduction of inverter switching losses. In flat-top modulation, the circuit state of the switching elements of one of the bridge arms is maintained constant through a predefined angular range of the fundamental wave, i.e. where two switching elements are provided per bridge arm, for example, one of the switching elements is permanently switched on and the other is permanently switched off. Pulse width modulation then occurs only in the other bridge arms. The predefined angular range can be, for example, 60° such that, over the entire fundamental wave, exactly one bridge arm is not switched in all cases, and thus generates no switching losses. This reduces switching losses by approximately 30%.

According to the invention, for example, six angular regions of a respective fundamental wave can be defined for flat-top modulation. The angular ranges can be of identical or different magnitude. The sum of all the angular ranges can be 360° or less than 360°. The size of the angular ranges can lie, for example, between 20° and 60°. The angular ranges constitute a "plateau".

According to the invention, a respective pulse duty factor for the switching elements of the bridge arms varies immediately ahead of and/or immediately after the angular ranges or plateaus within a predefined time interval, and specifically varies independently of the angle.

According to one form of embodiment, the respective pulse duty factor for the switching elements of the bridge arms varies immediately ahead of and/or immediately after the angular ranges, within the predefined time interval, in a time-dependent manner (as a function of time). Specifically, the respective pulse duty factor for the switching elements of the bridge arms varies immediately ahead of and/or immediately after the angular ranges, within the predefined time interval, in a ramped time-dependent manner, for example along a rising or falling ramp, specifically linearly along said rising or falling ramp.

According to one form of embodiment, a duration of the predefined time interval, specifically below a threshold rotating field frequency which can be generated by means of the inverter, is independent of the instantaneous rotating field frequency generated by means of the inverter. With respect to rotating fields which, in principle, can be generated by means of the inverter, and the frequencies thereof, reference should be made to the relevant specialized literature. The threshold rotating field frequency can lie, for example, in a range between 20 Hz and 60 Hz. The threshold rotating field frequency can be, for example, 40 Hz. If the rotating field frequency generated by means of the inverter is lower than the threshold rotating field frequency, the predefined time interval can be set with a constant duration. If the rotating field frequency generated by means of the inverter exceeds the threshold rotating field frequency, the predefined time interval can be set to reduce in duration as the rotating field frequency increases. Above the threshold rotating field frequency, the duration of the time interval can be selected as inversely proportional to the rotating field frequency until, beyond a further threshold rotating field frequency, the time interval ultimately disappears altogether.

According to one form of embodiment, a characteristic of the respective pulse duty factor within the predefined time interval is stable, and shows no abrupt step changes.

According to one form of embodiment, a characteristic of the respective pulse duty factor within the predefined time interval can be represented by a straight line with a predefined gradient (positive or negative).

According to one form of embodiment, the predefined time interval extends over a number of pulse width modulation periods. The number of periods can lie, for example, between 1 and 8. Below the threshold rotating field frequency, the number of periods can be constant, for example 8 and, above the threshold rotating field frequency, can be reduced continuously down to zero as the rotating field frequency increases.

According to one form of embodiment, the predefined time interval has a time duration in the range of 125 µs to 2 ms.

According to one form of embodiment, the following applies for a control angle $\alpha$ of pulse width modulated actuation: $-30° \leq \alpha \leq 30°$ and $\alpha \neq 0°$.

The inverter according to the invention comprises: a number of bridge arms with respective bridge terminals, wherein a respective bridge arm, on a first side, is electrically connected to a first intermediate circuit pole of the inverter, and wherein a respective bridge arm, on a second side, is electrically connected to a second intermediate circuit pole of the inverter. A respective bridge arm comprises at least two switching elements, wherein a respective bridge terminal, depending upon a circuit state of the switching elements of the bridge arm, whether without or with the interpolation of further components, is electrically connected either to the first intermediate circuit pole or to the second intermediate circuit pole. In a respective bridge arm, a current measuring means, for example in the form of a shunt resistor, is arranged, which assumes a measuring function according to a circuit state of the switching elements, or otherwise. The inverter further comprises a control unit, for example in the form of a microcontroller, which is configured to actuate the switching elements such that the above-mentioned method is executed.

According to the invention, specifically below a threshold rotating field frequency, no abrupt switchover is executed from an upper or lower plateau of flat-top modulation to a succeeding lower or upper plateau of flat-top modulation. Instead, a respective pulse duty factor for the switching elements of the bridge arms is varied during the transition between plateaus within a predefined time interval in a time-dependent and angularly-independent manner, wherein angle-independent intermediate pulses are introduced as the pulse duty factor changes. As a result, a continuous transition is executed during the current measurement switchover. In this region, or during this time interval, all the switching elements are still receiving pulses, such that a sample-and-hold capacitor of an A/D converter which is employed for current measurement has sufficient time to charge before the current measurement signal switches over to another phase.

Intermediate pulses associated with the changing pulse duty factor cannot be generated in an angle-dependent manner, but as temporal ramps, specifically of a defined gradient. This provides an advantage in that, at low rotating field frequencies, switching losses are lower, as the plateau/ramp ratio is rising. For current sensor technology, the time ramp is also ideal, as a sample-and-hold capacitor typically has a fixed charging time constant.

The number of intermediate pulses can, for example, be 8 at a switching frequency of 16 kHz. Depending upon the speed of rotation/switching frequency, the gradient of the ramp can also assume another value.

As the ramp invariably shows a slight lag, as a result of its time delay characteristic, an advantage is provided in comparison with angle-dependent intermediate pulse generation, in that the plateau also incorporates a time delay. The plateau consequently lies closer to the maximum current, as the phase angle of the motor current shows a delay in relation to the voltage (inductive behavior).

By means of the invention, for example, the following advantages can be achieved in comparison with conventional sinusoidal modulation: cost savings (associated with smaller heat sinks and IGBTs), smaller dimensions of the inverter or frequency converter, lower power losses in the inverter or frequency converter, and smaller bearing currents in the motor.

By means of the invention, for example, the following advantages can be achieved in comparison with conventional flat-top modulation: a superior quality of current measurement and lower interference currents in the motor (associated with flatter edges of the neutral point).

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
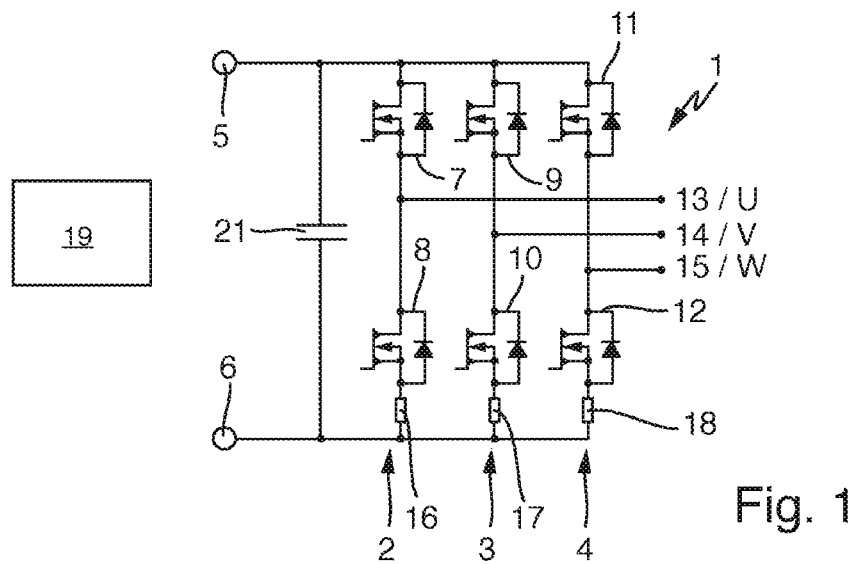
FIG. 1 is a schematic circuit diagram of an inverter according to an embodiment of the invention.

FIG. 1 shows an inverter 1 with three bridge arms 2, 3, 4, having respective bridge terminals 13, 14 or 15. On the bridge terminals 13, 14 and 15, for example, a three-phase AC motor can be connected. The bridge terminals 13, 14 and 15 can correspond, for example, to the phase potentials U, V or W, as represented.

A respective bridge arm 2, 3, 4 is electrically connected on an upper side to a first intermediate circuit pole 5 of the inverter 1, and electrically connected on a lower side to a second intermediate circuit pole 6 of the inverter 1. On the first intermediate circuit pole 5, a positive intermediate circuit potential is applied, and on the second intermediate circuit pole 6, a negative intermediate circuit potential is applied, wherein a potential difference between these potentials constitutes an intermediate circuit voltage, which is buffered by means of an intermediate circuit capacitor 21.

The first bridge arm 2 comprises two series-connected semiconductor switching elements 7 and 8, and a shunt resistor 16 connected between the semiconductor switching element 8 and the second intermediate circuit pole 6. The first semiconductor switching element 7, the second semiconductor switching element 8 and the shunt resistor are connected in series between the first intermediate circuit pole 5 and the second intermediate circuit pole 6. The bridge terminal 13 is constituted by a connection point of the semiconductor switching elements 7 and 8, and is thus electrically connected to the first intermediate circuit pole 5, in the event of a conducting first semiconductor switching element 7 and a non-conducting second semiconductor switching element 8. Correspondingly, the bridge terminal 13, in the event of a conducting second semiconductor switching element 8 and a non-conducting first semiconductor switching element 7, is electrically connected to the second intermediate circuit pole 6 via the shunt resistor 16.

The second bridge arm 3 correspondingly comprises two series-connected semiconductor switching elements 9 and 10, and a shunt resistor 17 connected between the second semiconductor switching element 10 and the second intermediate circuit pole 6. The first semiconductor switching element 9, the second semiconductor switching element 10 and the shunt resistor 17 are connected in series between the first intermediate circuit pole 5 and the second intermediate circuit pole 6. The bridge terminal 14 is constituted by a connection point of the semiconductor switching elements 9 and 10, and is thus electrically connected to the first intermediate circuit pole 5, in the event of a conducting first semiconductor switching element 9 and a non-conducting second semiconductor switching element 10. Correspondingly, the bridge terminal 14, in the event of a conducting second semiconductor switching element 10 and a non-conducting first semiconductor switching element 9, is electrically connected to the second intermediate circuit pole 6 via the shunt resistor 17.

The third bridge arm 4 correspondingly comprises two series-connected semiconductor switching elements 11 and 12, and a shunt resistor 18 connected between the second semiconductor switching element 12 and the second intermediate circuit pole 6. The first semiconductor switching element 11, the second semiconductor switching element 12 and the shunt resistor 18 are connected in series between the first intermediate circuit pole 5 and the second intermediate circuit pole 6. The bridge terminal 15 is constituted by a connection point of the semiconductor switching elements 11 and 12, and is thus electrically connected to the first intermediate circuit pole 5, in the event of a conducting first semiconductor switching element 11 and a non-conducting second semiconductor switching element 12. Correspondingly, the bridge terminal 15, in the event of a conducting second semiconductor switching element 12 and a non-conducting first semiconductor switching element 11, is electrically connected to the second intermediate circuit pole 6 via the shunt resistor 18.

The shunt resistors 16, 17, 18 (only) execute their measuring function if the lower switching elements 8, 10 or 12 are closed for a minimum time period, and the upper switching elements 7, 9 or 11 are correspondingly open.

The method according to the invention is described in detail hereinafter, with reference to FIGS. 2 to 4.

Figure 2:
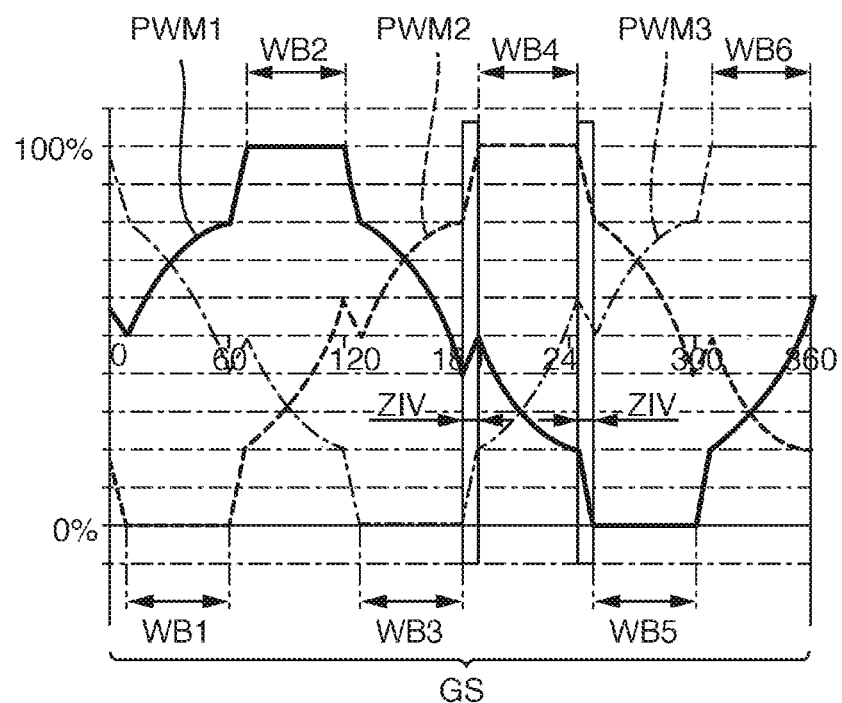
FIG. 2 shows angle-dependent characteristics of pulse duty factors of switching elements in the inverter represented in FIG. 1.
Figure 3:
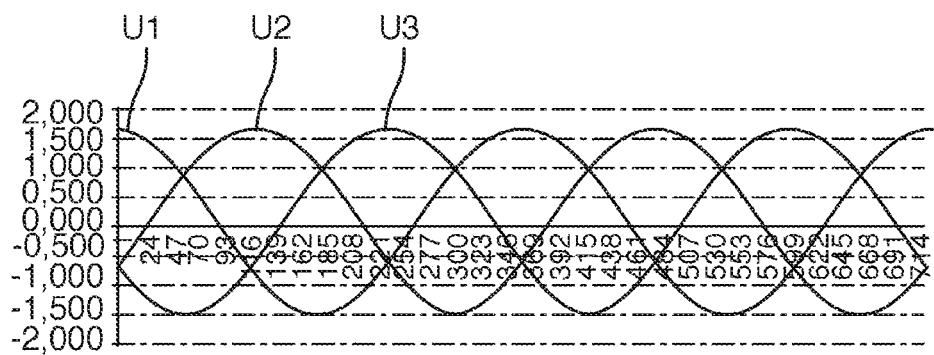
FIG. 3 shows angle-dependent characteristics of voltages between the bridge terminals of the inverter represented in FIG. 1.
Figure 4:
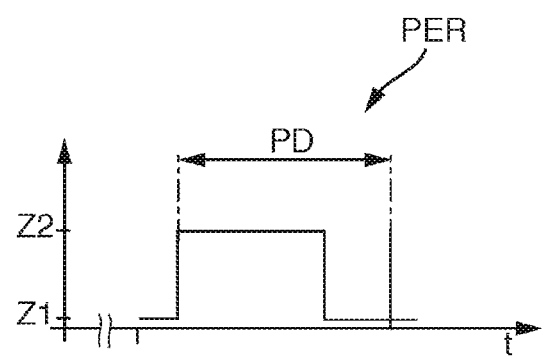
FIG. 4 shows an exemplary pulse width modulated actuation signal of a switching element of the inverter represented in FIG. 1.

With reference to FIGS. 2 to 4, the lower switching elements 8, 10 and 12 of the bridge arms 2, 3 or 4 are actuated by pulse width modulation with a temporally variable pulse duty factor PWM1, PWM2 or PWM3, such that the voltages U1, U2 or U3 between the bridge terminals 13, 14, 15 show a temporally dictated, approximately sinusoidal characteristic. The voltage U1 corresponds to a potential difference between the bridge terminals 14 and 15 or V and W, the voltage U2 corresponds to a potential difference between the bridge terminals 13 and 14 or U and V, and the voltage U3 corresponds to a potential difference between the bridge terminals 15 and 13 or W and U.

The lower switching element 8 of the bridge arm 2 is actuated with a pulse duty factor PWM1, the lower switching element 10 of the bridge arm 3 is actuated with a pulse duty factor PWM2, and the lower switching element 12 of the bridge arm 4 is actuated with a pulse duty factor PWM3. The characteristic of pulse duty factors for the upper switching elements 7, 9 or 11 is given by (1−PWM1), (1−PWM2) or (1−PWM3).

With reference to FIG. 4, a respective pulse duty factor PWM1, PWM2 or PWM3 indicates the proportion in which, relative to a pulse width modulation period PER with a cycle time PD, a lower switching element 8, 10 or 12 is switched on. A pulse duty factor of 100% indicates that the lower switching element 8, 10 or 12 is permanently switched on during a period PER. A pulse duty factor of 0% indicates that the lower switching element 8, 10 or 12 is permanently switched off during a period PER.

Again with reference to FIG. 2, the respective switching elements 7, 8; 9, 10; 11, 12 of the bridge arms 2, 3 or 4 are actuated for specific angular ranges or plateaus WB1, WB2, WB3, WB4, WB5, WB6 of a respective fundamental wave GS, with flat-top modulation.

Thus, in the plateau or angular range WB1, the lower switching element 12 of the bridge arm 4 is permanently off, and the upper switching element 11 of the bridge arm 4 is permanently on. A circuit state switchover of the switching elements only occurs in the bridge arms 2 and 3.

In the plateau or angular range WB2, the lower switching element 8 of the bridge arm 2 is permanently on, and the upper switching element 7 of the bridge arm 2 is permanently off. A circuit state switchover of the switching elements only occurs in the bridge arms 3 and 4.

The same applies correspondingly to the plateaus or angular ranges WB3 to WB6.

With reference to FIG. 2, a respective pulse duty factor PWM1, PWM2, PWM3 for the switching elements 7, 8; 9, 10; 11, 12 of the bridge arms 2, 3, 4 varies immediately ahead of and/or immediately after the plateaus or angular ranges WB1, WB2, WB3, WB4, WB5, WB6 within a predefined time interval ZIV in a consistent time-dependent and angularly-independent manner along ramps with a defined positive or negative temporal gradient. In the interests of simpler representation, only two time intervals ZIV are highlighted.

The angle-independent variation of the pulse duty factor specifically signifies that an angular extension (of the scanned angular range) of the time intervals ZIV varies in the event of a variation in a rotating field frequency which is generated by means of the inverter, specifically in a corresponding manner. Typically, the angular extension of the time intervals ZIV increases as the rotating field frequency rises. During the time intervals ZIV, the pulse duty factor is not dependent upon the angle, but upon time. The duration of the time intervals ZIV, at least below a threshold rotating field frequency of the order of 40 Hz, remains constant for all rotating field frequencies between 0 Hz and a value close to 40 Hz.

The time intervals ZIV extend over 8 pulse width modulation periods PER. The cycle time is 125 µs, i.e. the duration of the time intervals ZIV in the present exemplary case is 2 ms.

According to the invention, the quality of current measurement by means of the shunt resistors 16, 17, 18 can be improved by a continuous transition between pulse width modulation plateaus.

A further advantage of the invention is provided in that current take-up from a "bootstrap" infeed, with limited modulation, is no longer executed simultaneously and abruptly on all 3 bridge arms, but proceeds in a continuous and current-limiting manner by means of the ramp. This results in a reduced current ripple in the bootstrap power supply. As the bootstrap current is also measured in tandem by the current sensor circuitry, there is a resulting advantageous impact upon the quality of current measurement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an inverter, wherein the inverter comprises:
    a plurality of bridge arms, each of which has a bridge terminal,
    wherein each of the bridge arms is electrically connected on a first side to a first intermediate circuit pole of the inverter and electrically connected on a second side to a second intermediate circuit pole of the inverter,
    wherein each of the bridge arms comprises at least two switching elements, wherein the bridge terminal, depending upon a circuit state of the switching elements, is electrically connected either to the first intermediate circuit pole or to the second intermediate circuit pole, and
    wherein a shunt resistor is arranged in each of the bridge arms,
    wherein the inverter is configured to generate a rotating field frequency having multiple values including at least two non-zero frequencies;
    the method comprising the steps of:
    actuating the switching elements of the bridge arms via pulse width modulation with a temporally variable pulse duty factor, such that voltages between the bridge terminals show a temporally defined characteristic,
    wherein the switching elements of the bridge arms are actuated with flat-top modulation for specific angular ranges of a fundamental wave,
    wherein the temporally variable pulse duty factor for the switching elements of the bridge arms, immediately ahead of or immediately after the angular ranges, varies within a predefined time interval in an angularly-independent manner.

2. The method according to claim 1, wherein
the temporally variable pulse duty factor for the switching elements of the bridge arms, immediately ahead of and/or immediately after the angular ranges, varies within the predefined time interval in a time-dependent manner.

3. The method according to claim 1, wherein
a duration of the predefined time interval, below a threshold rotating field frequency, is independent of the rotating field frequency generated by the inverter.

4. The method according to claim 1, wherein
a characteristic of the temporally variable pulse duty factor remains constant within the predefined time interval.

5. The method according to claim 1, wherein
a characteristic of the temporally variable pulse duty factor, within the predefined time interval, is represented by a straight line with a predefined gradient.

6. The method according to claim 1, wherein
the predefined time interval extends over a number of pulse width modulation periods.

7. The method according to claim 6, wherein
the number of pulse width modulation periods lies between 1 and 8.

8. The method according to claim 1, wherein
the predefined time interval has a time duration in the range of 125 µs to 2 ms.

9. An inverter, comprising:
    a plurality of bridge arms, each of which has a bridge terminal,
    wherein each of the bridge arms is electrically connected on a first side to a first intermediate circuit pole of the inverter and electrically connected on a second side to a second intermediate circuit pole of the inverter,
    wherein each of the bridge arms comprises at least two switching elements, wherein the bridge terminal, depending upon a circuit state of the switching elements, is electrically connected either to the first intermediate circuit pole or to the second intermediate circuit pole, and wherein a shunt resistor is arranged in each of the bridge arms, and a control unit which is configured to:

actuate the switching elements of the bridge arms via pulse width modulation with a temporally variable pulse duty factor, such that voltages between the bridge terminals show a temporally defined characteristic, wherein the switching elements of the bridge arms are actuated with flat-top modulation for specific angular ranges of a fundamental wave, and wherein the temporally variable pulse duty factor for the switching elements of the bridge arms, immediately ahead of or immediately after the angular ranges, varies within a predefined time interval in an angularly-independent manner; and wherein the inverter is configured to generate a rotating field frequency having multiple values including at least two non-zero frequencies.

10. The inverter according to claim 9, wherein
the temporally variable pulse duty factor for the switching elements of the bridge arms, immediately ahead of and/or immediately after the angular ranges, varies within the predefined time interval in a time-dependent manner.

11. The inverter according to claim 9, wherein
a duration of the predefined time interval, below a threshold rotating field frequency, is independent of the rotating field frequency generated by the inverter.

12. The inverter according to claim 9, wherein
a characteristic of the temporally variable pulse duty factor remains constant within the predefined time interval.

13. The inverter according to claim 9, wherein
a characteristic of the temporally variable pulse duty factor, within the predefined time interval, is represented by a straight line with a predefined gradient.

14. The inverter according to claim 9, wherein
the predefined time interval extends over a number of pulse width modulation periods.

15. The inverter according to claim 14, wherein
the number of pulse width modulation periods lies between 1 and 8.

16. The inverter according to claim 9, wherein
the predefined time interval has a time duration in the range of 125 µs to 2 ms.

* * * * *